United States Patent
Martin et al.

[11] Patent Number: 5,989,433
[45] Date of Patent: Nov. 23, 1999

[54] METHOD OF TREATING A PHOTOGRAPHIC PROCESSING SOLUTION

[75] Inventors: Didier J. Martin, Givry; Olivier J. Poncelet; Jeannine Rigola, both of Chalon sur Saone, all of France

[73] Assignee: Eastman Kodak Company, Rochester, N.Y.

[21] Appl. No.: 09/062,959

[22] Filed: Apr. 20, 1998

[30] Foreign Application Priority Data

Apr. 24, 1997 [FR] France .................................. 97 05307

[51] Int. Cl.$^6$ .................................................. B01D 61/00
[52] U.S. Cl. ........................ 210/653; 210/651; 210/490; 210/500.26; 210/634; 210/257.2; 430/398; 430/399; 430/400
[58] Field of Search .................................... 210/651, 652, 210/653, 500.25, 490, 500.26, 634, 257.2; 430/398, 399, 400

[56] References Cited

U.S. PATENT DOCUMENTS

| | | | |
|---|---|---|---|
| 4,451,132 | 5/1984 | Kishimoto | 430/398 |
| 5,355,191 | 10/1994 | Nakamura et al. | 430/398 |
| 5,633,125 | 5/1997 | Martin | 430/398 |
| 5,679,503 | 10/1997 | Martin et al. | 430/400 |
| 5,846,428 | 12/1998 | Martin et al. | 210/651 |

FOREIGN PATENT DOCUMENTS 0 736 249  10/1996  European Pat. Off. ....... A01N 25/04

*Primary Examiner*—Ana Fortuna

[57] ABSTRACT

The present invention concerns a method of extracting halide ions contained in a photographic processing solution. The invention concerns a method for the selective extraction of halide ions using a separative membrane comprising a support covered with an active layer comprising an inorganic hydrogel material and an ion carrier, one of the faces of the support having been surface-modified. This method effectively regenerates photographic solutions.

13 Claims, 2 Drawing Sheets

METHOD OF TREATING A PHOTOGRAPHIC PROCESSING SOLUTION

The present invention concerns a method of extracting halide ions contained in a photographic processing solution. In particular, the invention concerns a method for the selective extraction of halide ions using an inorganic separative membrane.

It is known that photographic baths can be regenerated with ion exchange resins, or by electrodialysis. During the processing of exposed photographic products, the processing solutions are seasoned with chemical compounds coming from the photographic products. The presence of these compounds progressively reduces the efficacy of the bath. It is therefore important to be able to regenerate these baths by eliminating these compounds continuously or in batches. This regeneration is all the more useful if it is selective and does not change the properties of the medium, in particular the pH and dilution.

In the case of fixing baths, the regeneration must eliminate from this bath the halides coming from the processing of silver halide photographic products in the presence of other chemical compounds such a thiosulphates. This is because the purpose of the fixing bath is to solubilise the undeveloped silver halides. The halides rapidly accumulate in the fixing bath and reduce its efficacy. French patent application FR 9509897 describes a method for selectively extracting the halide ions by nanofiltration.

In the case of a developer, when silver halide photographic products are developed, the developer is seasoned with halide ions coming from the photographic product. When these ions are bromide or iodide ions, they considerably slow down the image development speed. The problem lies in the selective and preferably continuous elimination of bromide and/or iodide ions contributed by the film in order to keep the activity of the bath constant. If this is not the case, the bromide and/or iodide concentration in the developer would increase continuously, which would make the developer rapidly unusable.

It is known that the bromide and/or iodide ions released during the development in colour developers can be eliminated with an anion exchange resin in order to eliminate the bromide or iodide ions.

European patent EP 178539 describes a method of treating a seasoned developer with an ion exchanger which contains OH$^-$ groups as exchangeable groups.

The article "Developer recycling—A new generation", Meckl, Journal of Imaging Technology, 13, 1987, 3, 85–89, describes a system in which the effluent at the outlet from the development tank is poured into a holding tank, and then passes through an ion exchange resin in order to eliminate the bromide ions. Replenishing compounds are added to this effluent from which the bromide ions have been removed. The replenishing solution thus obtained can be reused as a developer.

No known technique makes it possible to separate the halide ions effectively from the organic compounds, such as hydroquinone and its derivatives. In addition, there exists no technique which can be used with different processing solutions.

It is important to use a processing method which makes it possible to control the dilution of the solution to be treated. Up till now the regeneration of black and white baths by dialysis could not be obtained because the known membranes did not make it possible to control the flow of water which causes dilution of the bath.

One of the aims of the invention is to provide a method of treating a used photographic bath in order to selectively extract the ionic species therefrom, these photographic processing solutions being solutions as varied in composition as a developer, a fixing bath, a bleaching solution or a bleaching and fixing solution.

The second aim of the invention is to provide a method of treating used photographic baths which exhibits selectivity between different ionic species but also selectivity between ionic species and organic species, even when they are of comparable sizes.

Another aim of the invention is to provide a method of treating a used photographic bath which makes it possible to control the dilution of the bath in order to be able to obtain, after regeneration, solutions which are little modified with respect to their initial concentrations of chemical substances.

These aims and others are achieved by the present invention, which concerns a method of treating a photographic bath containing ionic species to be selectively extracted, which comprises putting the bath to be treated in contact with a membrane comprising a support covered on one of its faces with an active layer comprising an inorganic hydrogel material and an ion carrier and on the other face a layer for increasing the hydrophobicity of the support, the layer for increasing the hydrophobicity being applied to the support before the active layer.

In the description which follows, reference will be made to the drawings in which.

Figure 1:
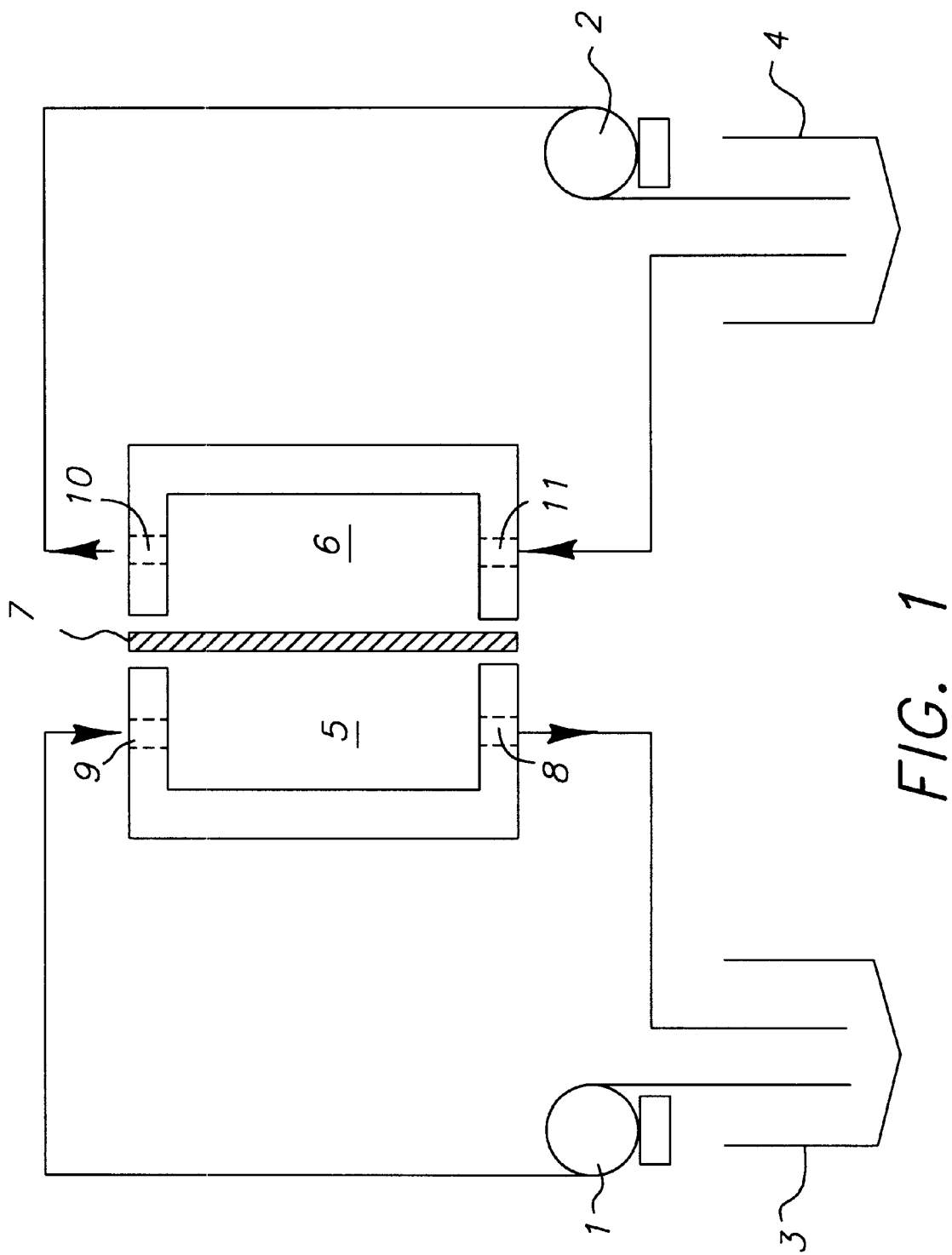
FIG. 1 is a separation device of the invention.
Figure 2:
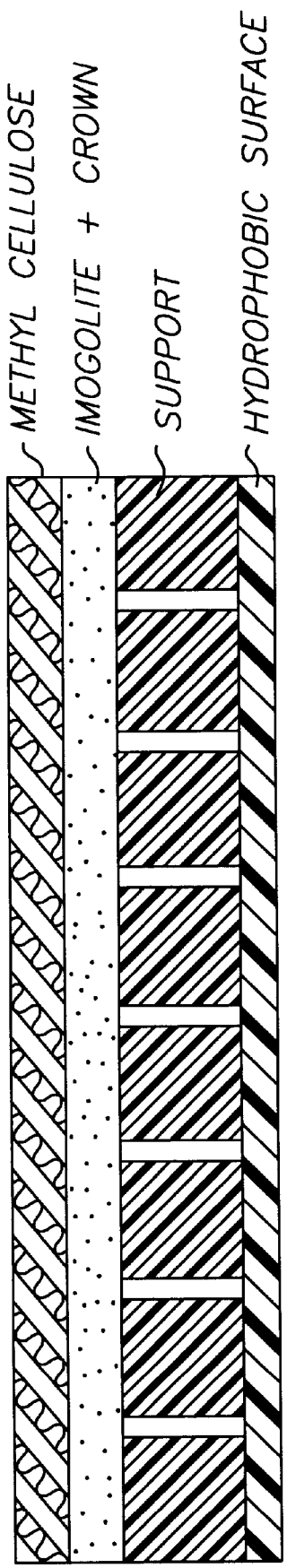
FIG. 2 is a view in section of an embodiment of the membrane of the present invention.

The method of the invention is effective for the treatment of photographic developers in which it is wished to eliminate the bromide and/or iodide ions contributed by the photographic films during processing. By means of this method, the halide ions are eliminated selectively with respect to the other organic or ionic compounds contained in the developer.

The present method also makes it possible to treat a used fixing bath effectively. With the method of the invention, the bromide ions are extracted selectively with respect to the other compounds contained in the fixing bath, in particular with respect to thiosulphate ions.

In addition, the method of the invention makes it possible to control the water flow between the solution to be treated and the solution receiving the extracted species (the trap solution), which improves the performance of the regenerated photographic baths whilst limiting the quantity of replenisher to be used. In this way the consumption of chemical substances and the treatment of effluents are reduced.

A high chemical and mechanical resistance of the membrane is obtained by virtue of the inorganic lattice which forms the active layer.

In the method of the invention, the photographic bath to be processed can be directly or indirectly in contact with the membrane, and the membrane can comprise a layer protecting the active layer.

In the context of the present invention, the membrane support is an organic or inorganic porous support. These organic or inorganic porous supports are well known products and constitute membranes per se. The porosity of the support is chosen as a function of the species to be selectively separated. In general the porosity of the support is between 10 and 20 μm.

The inorganic supports are for example supports made from silica, alumina, zirconia or titanium oxide or a mixture of these oxides. They can also be made from carbon, optionally covered with a fine layer of oxide.

The organic supports are for example cellulose or cellulose derivative supports, or polyacrylonitrile, polysulphone or polyethylsulphone supports. In the context of the invention, preference is given to supports having active groups on the surface, for example hydroxyl groups. When the chosen support does not inherently have such active groups on the surface, it is possible to create them by means of a suitable chemical treatment of the support, for example by treating the support with an acid, a base or a silicon and aluminium halide. These active groups are in general hydroxyl groups or acids. According to a particular embodiment, the organic porous support is a cellulosic support.

The organic or inorganic supports can also include functionalised groups making it possible to have a positive surface charge (for example by introducing ammonium or phosphonium groups) or a negative surface charge (for example by introducing sulpho, carboxy, etc groups). The supports can be in the form of flat, spiral or tubular modules or in the form of hollow fibres. These supports are chosen so as to be photographically inert.

In the method of the invention, the membrane comprises an active layer comprising an inorganic hydrogel material and an immobilised ion carrier.

Such an inorganic hydrogel material is for example an aluminosilicate in gel form or a phyllosilicate.

According to a preferred embodiment, the inorganic hydrogel material is an aluminosilicate of the imogolite type. Imogolite is a fibrous aluminosilicate polymer which has the formula $Al_xSi_yO_z$ in which the ratio $x/y$ is between 1.5 and 2.5 and z is between 2 and 6. This aluminosilicate exists in the natural state; it was first described by Wada in J. Soil Sci. 1979, 30(2), 347–355.

Imogolite can be synthesised by various methods. Examples of synthesis are described in U.S. Pat. Nos. 4,252,779, 4,241,035 and 4,152,404 in the name of Farmer.

Imogolite can also be synthesised by the method described in PCT/EP patent application No 95/04165, filed on Oct. 24, 1995 in the name of Kodak-Pathé and Eastman Kodak Co. This method makes it possible to synthesis a majority of the imogolite in the form of fibres. The imogolite used in the examples of the present invention was prepared in accordance with the method described in this application.

The imogolite composition which is applied to the support preferably contains between 0.5 and 5 g/l of imogolite.

In the context of the present invention, the ion carrier is a compound capable of complexing the ions to be extracted from the aqueous solution to be treated and to convey them in the receiving aqueous solution (the trap solution). These ion carriers are known in the art. They are in general macrocyclic compounds, for example macrocyclic polyethers, or quasi cyclic, which can contain one or more heteroatoms chosen for nitrogen (azacrown), sulphur, etc.

Examples of useful macrocyclic compounds were described in "Crown compounds, their characteristics and application", Michio Hiraoka, Elsevier 1982, ISBN 0-444-99692-3; "The chemistry of ethers, crown ethers, hydroxyl groups and their sulfur analogues", Paul Patai, Interscience Publication, 1980, ISBN 0-471-27771-1.

Macrocyclic compounds which can be used are: dibenzo-18-crown-6 of formuala (A)

dibenzo-18-crown-6 of formula (A)

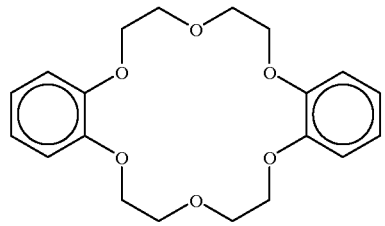

benzo-18-crown-6 of formula (B)

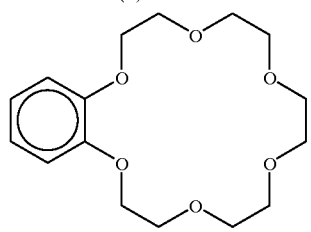

18-crown-6 of formula (C)

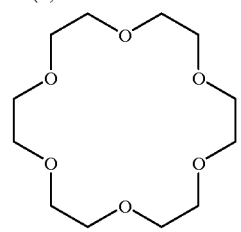

4,7,13,16,21,24-hexaoxa 1,10-diazabicyclo [8,8,8]-hexacosane of formula (D)

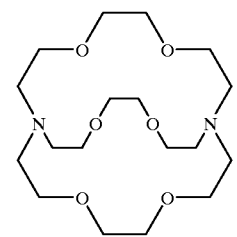

In the present invention, the ion carrier is mixed with the hydrogel material before being coated on the support. The layer obtained from this mixture forms the active layer in which the carrier is immobilised.

The concentration of ion carrier in the mixture is generally between $10^{-4}$ and 1 mol/l of mixture.

According to the present invention, the surface of the membrane is modified in order to make it hydrophobic. The surface of the membrane can be modified by different methods known in the art. Depending on the nature of the membrane support, it may be advantageous to modify the surface of the membrane by a sol-gel process, the conditions of implementation of which are gentle and controlled, unlike other known methods such as CVD. The sol-gel method affords a greater choice of support, for example supports which are not high temperature resistant.

According to a preferred embodiment, the hydrophobicity of the surface of the membrane is modified according to a method which comprises the steps of:

a) applying, to one of the faces of the membrane, a homogeneous solution comprising one or more rare earth or alkaline earth fluoroalkoxides in an anhydrous organic solvent at room temperature, b) hydrolysing the fluoroalkoxide or fluoroalkoxides of the layer formed at a) and c) washing the membrane with water in order to eliminate the soluble salts formed.

These different steps can be reproduced several times in order to obtain the required hydrophilicity.

Such a method, as well as the preparation of rare earth or alkaline earth fluoroalkoxides, are described in detail in the patent application FR 9501541 filed on Nov. 22, 1995.

This method makes it possible to selectively modify the hydrophobicity of the membrane either solely on the external surface of the membrane or on the entire surface, that is to say all the external surfaces of the membrane and the specific surface area of the pores inside the membrane. The application of the layer of fluoroalkoxide can be repeated until the desired water flow is obtained.

In the context of the invention, it is preferable for the hydrophobicity of the support after treatment to be such that the water flow through the membrane is reduced by at least 50% compared with the water flow through the untreated support.

The fluoroalkoxides which can be used are for example the fluoroalkoxides of elements in group IIA, such as beryllium, magnesium, calcium, strontium, barium or radium fluoroalkoxide and the rare earth fluoroalkoxides chosen from amongst the fluoroalkoxides of elements in group IIIB, such as scandium, yttrium, lanthane, cerium, gadolinium, erbium or ytterbium fluoroalkoxide.

The preferred fluoroalkoxides are barium, calcium and strontium fluoroalkoxides. Such compounds are described in the patent application cited above.

The solution of fluoroalkoxides can be applied to the surface of the membrane by any known method for applying sol-gel, for example by using a coating bar, an air knife or a transfer cylinder or by immersion, plate coating, bead coating or curtain coating or by spraying or else by circulating the fluoroalkoxide in the reactor containing the membrane under suitable conditions.

In step b) the quantity of water required for hydrolysing the fluoroalkoxides must be at least equal to the stoichiometric quantity, and less than 5 times and preferably less than twice this stoichiometric quantity. The operation is generally carried out at ambient humidity. This hydrolysis can be combined with any other known complementary method which does not impair the support, such as placing the membrane in an oven at controlled humidity.

After hydrolysis, the solvent is left to evaporate.

The thickness of the layer obtained can be varied either by varying the initial concentration of metallic fluoroalkoxides or by repeating the sequence a)–b) several times and leaving the porous support in the open air for a few minutes between each deposition. It is also possible in the same way to produce several layers successively with fluoroalkoxides which are different through the nature of the alkoxo radical or by the nature of the alkaline earth metal (or rare earth).

At step c) the membrane is rinsed with water. This step eliminates the water-soluble metallic salts which could be detrimental when using the membrane to treat certain solutions, such as photographic solutions.

The different steps of the method can be implemented one or more times continuously.

The processing baths which can be treated with the method of the present invention are conventional photographic processing baths. These baths can be developers, fixing baths, bleaching baths or bleaching/fixing baths.

Conventionally, the processing of black and white photographic products comprises a silver development step and a fixing step, as well as one or more washing steps. The processing of colour photographic products comprises a colour development step, a bleaching step and a fixing step, where the bleaching and fixing steps can be combined in a single step.

The developers contain a developing agent which can be organic or inorganic. Developing agents are described in T H James "The Theory of the Photographic Process", 4th Ed, Macmillan, 1977, chapters 11 and 12. The most conventional developing agents are dihydroxybenzene compounds, such as hydroquinone, ascorbic acid or one of its derivatives, pyrazolidinones and aminophenols. There are also developers containing inorganic developing agents which are metals having at least two distinct oxidation states and which are capable of reducing silver ions into metallic silver. These metals are for example iron, titanium, vanadium or chlorine. These metals are combined with chelating agents.

In the case of a colour developer, the developing agent used is generally a p-phenylenediamine compound.

The development baths can contain a large number of compounds other than the developing agent. They can contain for example preservatives, anti-fog agents, or chelating agents in order to prevent the precipitation of calcium or magnesium. They can also contain buffer solutions in order to keep the pH of the processing solution constant, compounds for reducing the residual colour, solubilising agents and development accelerators or inhibitors.

The different compounds which can make up a photographic developer are described in detail in Research Disclosure, September 1994 No 365.44 (hereinafter referred to as Research Disclosure) Section XIX.

The bleaching baths which enable the metallic silver to be converted into silver ions comprise polyvalent metallic compounds such as iron (III), cobalt (III), chromium (VI), copper (II), peracids, quinones and nitro compounds.

Typically, the bleaching solutions contain a complex formed from ferric ions and aminopolycarboxylic acids.

Compounds which can be used in bleaching baths are described in Research Disclosure, Section XX.A.

The fixing bath for photographic processing consists of completely converting the unexposed silver halides into a water-soluble silver complex, this complex then being eliminated from the layers of the photographic product by washing. The compounds used for fixing are described in paragraph XX.B of Research Disclosure. In general thiosulphates such as ammonium thiosulphate or alkali metals are used.

The bleaching step and fixing step can be combined in a single step by means of a bleaching/fixing solution. Such solutions are described in Research Disclosure XX.C.

All these processing solutions can contain preservatives, pH modifiers, chelating agents, agents reducing the residual colour and solubilising agents.

The photographic processing can use a certain number of complementary baths such as washing baths, rinsing baths, stabilising baths and stopping baths.

These baths are described in Research Disclosure Section XX.D.

The present invention is described in more detail in the following examples.

EXAMPLES

Example 1

Synthesis of aluminosilicate gel of the imogolite type.

In an inert (polytetrafluoroethylene) reactor containing a solution of $AlCl_3, 6H_2O$ (31.2 mmol) (manufactured by Aldrich® 99% purity) and 1000 ml of demineralised water)

there was added a solution of Si(OEt)$_4$ (16.7 mmol) (manufactured by Ventron® 99% purity) in 1000 ml of demineralised water. The mixture was stirred vigorously.

After 20 minutes, a solution of NaOH,1M was added gently whilst stirring until a pH of 4.5 was obtained. In this way a cloudy solution was obtained.

After one night under stirring the solution became clear again. The pH was then adjusted by adding NaOH,1M.

A white gel was obtained which was centrifuged at 2000 rpm for 20 mins. The gel was the n solubilised by adding 5 ml of a mixture (50/50) of hydrochloric acid (1M) and acetic acid (2M).

This solution was completed with demineralised water in order to obtain 1 liter of solution.

This solution (1) contained approximately 30 mmol of aluminium, 16.6 mmol of silicon and 5 mmol of acetic acid.

The solution thus obtained was diluted in two liters of water in order to obtain an aluminium concentration of 10 mmoles/l, and then heated to a temperature of between 95 and 100° C., in the presence of silanol.

After 120 hrs of heat treatment, the solution was cooled again, purified and concentrated by ultrafiltration.

Example 2
Modification of the surface of the membrane support by the application of barium fluoroalkoxide.
Formation of barium fluoroalkoxide Ba6R 13.6 g (0.0099 mol) of barium was put in solution under argon in 200 ml of anhydrous ethanol. The reaction was exothermic with the release of hydrogen. The reaction medium was filtered in order to eliminate the residual colloids. The filtrate was concentrated at 10$^{-2}$ mm Hg and dried for 12 hrs in order to give a pulverulent white powder, the elementary analysis of which showed that it contained approximately 60% by weight of barium.

22.5 g of this power was introduced under argon into 300 ml of anhydrous tetrahydrofurane (THF), and then 21 ml of hexafluoro-2-propanol was added dropwise at room temperature.

The mixture was left to react for 2 hours under stirring (highly exothermic reaction). The product was purified by crystallisation in anhydrous tetrahydrofurane. 42 g of white barium fluoroalkoxide powder was collected, the elementary analysis of which showed that it contained approximately 30% by weight of barium.
Formation of the layer modifying the surface of the support of the membrane 1 g of barium fluoroalkoxide obtained previously was put in solution in 50 ml of anhydrous ethanol under inert gas. This solution was applied to a Spectra/Por® porous regenerated cellulose support having a cutoff threshold of 6000 to 8000 daltons (pore diameter approximately 2 nm) by coating. Four applications were performed on the support, and at each application a layer with a thickness of 125 μm was obtained. Between each deposition, the support was left in open air for 5 mins. Hydrolysis took place with atmospheric moisture. In this way four layers of barium fluoroalkoxide were deposited. The porous support was then immersed in osmosed water in order to eliminate the soluble salts present in the layer.

As the water flow values show (%H$_2$O; Table 1), the hydrophobicity of the face of the cellulose support treated with barium fluoroalkoxide had thus been greatly modified.

Example 3
Preparation of the membrane.
3.1: modification of the hydrophobicity of the support A Spectra/Por® cellulose support as defined above was coated four times by means of a solution of Ba6R (a solution consisting of 1 g of solute in 50 ml of anhydrous methanol) as described previously. Between each layer of Ba6R, it was left to dry for a few minutes.

3.2: preparation of the active layer

The modified support as described above was then immersed in osmosed water for 1 hour.

The still wet support was coated on the untreated face with the solution containing the imogolite prepared according to the method of Example 1 and a crown ether (18.6 g of 18-crown-6 in solution in 50 g of imogolite (1.18 g/l, including Si=0.424 g and Al=0.753 g).

The support was once again immersed in osmosed water for 24 hrs. A second layer of the solution of imogolite and crown ether was then deposited on the previous layer. This solution was coated by means of a knife making it possible to obtain a 100 μm thick layer on the cellulose support. In this way the active layer of the membrane was obtained.

After drying, a protective layer of methyl cellulose was deposited on the last layer of imogolite-ether-crown under the same coating conditions using an aqueous solution of methyl cellulose (400 cp) at 0.2 g/l.

The selectivity results for the membrane thus obtained are set out in Table 1 below.

Example 4
Comparative 18.6 g of 18-crown-6 was put in solution in 50 g of imogolite (0.98 g/l where Si=0.36 g and Al=0.62 g). This solution was coated using a blade which made it possible to deposit a layer with a thickness of 100 μm on a cellulose support as described previously. In this way the active layer was obtained.

After drying, a layer of methyl cellulose was deposited on the previous active layer under the same coating conditions using an aqueous solution of methyl cellulose (400 cp) at 0.2 g/l.

After drying, the back of the cellulose support was coated by means of a solution of barium fluoroalkoxide Ba6R prepared according to the method described in Example 2 (1 g of fluoroalkoxide in 50 ml of anhydrous methanol). Four passes over the support were effected by means of a blade enabling a 125 μm thick layer to be deposited. Between each deposition, the porous support was left in open air for 5 min.

Hydrolysis took place through atmospheric moisture. The solvent was left to evaporate.

After 5 min, the porous support was immersed in a beaker of osmosed water in order to eliminate the soluble barium salts formed.

The selectivity results for the membrane thus obtained are set out Table 1 below.

Example 5

In this example, a solution containing solely the imogolite prepared according to the method of Example 1 was applied to a Spectra/Por® cellulose support whose hydrophobicity had not been modified.

The selectivity results for the membrane thus obtained are set out in Table 2 below.

Example 6

In this example, a solution containing imogolite and the 18-crown-6 ion carrier described previously was applied to a Spectra/Por® cellulose solution whose hydrophobicity had not been modified.

The selectivity results for the membrane thus obtained are set out in Table 2 below.

Example 7
Selectivity results for the membrane

Example 7.1

In order to determine the separation characteristics of the membranes described previously, each of these membranes was put in contact with a photographic developing solution containing bromide ions to be eliminated selectively. The developer used contained:

hydroquinone (HQ) 21.00 g/l
hydroquinone monosulphate (KHQS) 13.40 g/l
phenidone-A 0.69 g/l
bromide* 3.46 g/l
sulphite* 8 g/l
pH adjusted to 9.9
water in sufficient quantity for obtaining 1 liter of solution
*The bromide and sulphite were in the form of Na salts.

The device depicted in FIG. 1 was used. The system was composed of two compartments 5 and 6 each containing approximately 50 ml, separated by a 10 $cm^2$ membrane 7, the whole forming a sealed system. 500 ml of developing solution contained in the reactor 3 circulated in the compartment 5 from the inlet 9 to the outlet 8 by means of a pump 1 with an output of 25 ml/min. 180 ml of water contained in the reactor 4 circulated in the reverse direction in the compartment 6 from the inlet 11 to the outlet 10 by means of the pump 2 with an output of 25 ml/min.

The separation results are set out in Table 1 below.

TABLE 1

RESULTS

|  | $H_2O$ flow | Br flow/24 hrs | Max tmin | FS1 | FS2 |
|---|---|---|---|---|---|
| Ex. 2 | 3% | 28% | 600 | 2.2 | 3.6 |
| Ex. 3 | 3% | 32% | 960 | infinite | 3.0 |
| Ex. 4 | 6.6% | 28% | 1440 | 5.6 | 2.3 |

These examples show that, with the membrane of the present invention, the water flow is greatly reduced. With such a membrane, a maximum extraction selectivity for the membrane is also obtained. In Example 4, the comparative membrane has a greater reduced selectivity and a high water flow. These results show that the membrane of the invention greatly increases the selectivity whilst reducing the hydroquinone and hydroquinone monosulphonate losses.

TABLE 2

|  | $H_2O$ flow | Br flow/ 24 hrs | Max tmin | HQ + KHQS % (extracted) | FS1 | phenidone (extracted) | FS2 |
|---|---|---|---|---|---|---|---|
| Ex. 5 | 3% | 33% | 600 | 12 | 2.6 | 7% | 2.3 |
| Ex. 6 | 3% | 34% | 480 | 6 | 2.8 | 1.8% | 3.5 |
| Ex. 2 | 3% | 28% | 600 | 9.5 | 2.2 | 5.8% | 3.6 |
| cellulose | 6% | 29% | 600 | 19 | 2.0 | 12% | 1.8 |

*in this example, the Spectra/Por® cellulose support is used as a membrane without any other treatment.

If a comparison is made of the results obtained with the untreated cellulose and Example 5, it is clear that the imogolite coating on the cellulose support modifies the hydrophilic/hydrophobic balance of the membrane. A reduction in the water flow through the membrane is noted without however affecting the extraction kinetics of the bromide ions. The introduction of a carrier in the imogolite strongly increases the extraction kinetics of the bromide ions without modifying the water flow. In addition, the organics loss is reduced when the carrier is present. The extraction of the bromide ions in this case is much more selective.

None of these membranes gives results as effective as those obtained with the present invention.

Example 7.2

In this example, the separation characteristics of the membranes described previously were determined by putting each of these membranes in contact with an ascorbic acid developer containing bromide ions to be eliminated selectively. The developer used contained:

potassium carbonate 400 g
$K_2SO_3$ (45% p) 222 g
benzotriazole 0.4 g
HMMP 5 g
Potassium bromide 8 g
Antical 8® (40%) 8.6 g
Ascorbic acid 64 g
Water in sufficient quantity for obtaining 2 liters of solution.
HMMP: hydroxymethylmethyl pyrazolidinone.

As before, the assembly depicted in FIG. 1 was used. The separation results are set out in Table 3 below.

TABLE 3

|  | $H_2O$ flow | Br flow/24 hrs | Max tmin | FS3 | FS4 |
|---|---|---|---|---|---|
| Ex. 3 | 5.4% | 31% | 360 | infinite | 3.6 |
| Ex. 4 | 7.2% | 25% | 360 | 0.6 | 0.8 |

These examples show that, with the membrane of the present invention, the water flow is greatly reduced. These results show that the membrane of the invention greatly increases the selectivity whilst reducing the ascorbic acid losses.

Definition of the parameters of the different tables:

Max tmin : period necessary for reaching the maximum bromide extraction value or at least 80% of the value at 24 hrs, reversal point).

FS1: extraction selectivity for Br ions compared with hydroquinone (HQ) and hydroquinone monosulphonate (KHQS) at Max tmin.

FS2: extraction selectivity for bromide ions compared with phenidone at Max tmin. (Ratio in % extracted)

HQ+KHQS (extracted): % HQ and KHQS present in water at 24 hrs.

Phenidone (extracted): % phenidone present in water at 24 hrs.

FS3: extraction selectivity for Br versus ascorbic acid at Max tmin.

FS4: extraction selectivity for bromide compared with HMMP at Max tmin.

What is claimed is:

1. Method of treating a photographic bath containing ionic species to be extracted selectively, which comprises putting the bath to be treated in contact with a membrane comprising a support covered on one of its faces with an active layer comprising an inorganic hydrogel material and an ion carrier and on the other face with a layer for increasing the hydrophobicity of the support, the layer for increasing hydrophobicity being applied to the support before the active layer.

2. Method according to claim 1, wherein the selective species to be extracted from the bath is bromide and/or iodide ions.

3. Method according to claim 1, wherein the hydrogel material is aluminosilicate of the imogolite type.

4. Method according to claim 1, wherein the ion carrier is selected from macrocyclic polyethers or macrocyclic polyethers containing one or more heteroatoms selected from sulphur, nitrogen or oxygen.

5. Method according to any one of claims 1 to 4, wherein the layer for increasing the hydrophobicity of the support is obtained by applying a solution of rare earth and/or alkaline earth fluoroalkoxide to the support, followed by hydrolysing and washing the layer.

6. Method according to claim 1, wherein the layer for increasing the hydrophobicity of the support is such that the water flow through the membrane is reduced by at least 50% compared with the water flow through the untreated support.

7. Method according to claim 1, wherein the membrane also comprises a protective layer for the active layer.

8. Method according to claim 1 for selectively extracting bromide and/or iodide ions contained in a seasoned developer.

9. Method according to claim 8 for treating a developer containing hydroquinone or a hydroquinone derivative.

10. Method according to claim 8 for treating a developer containing ascorbic acid or an ascorbic acid derivative.

11. Method according to claim 1 for selectively extracting halide ions contained in a fixing bath.

12. Method according to claim 11 for selectively extracting halide ions contained in a thiosulphate fixing bath.

13. Device for the selective extraction of halide ions contained in photographic baths comprising a first zone for receiving the photographic bath and a second zone containing a trap solution, the two zones being separated by a selective membrane as defined in any one of claims 1 to 7, the active layer of the membrane being in contact with the photographic bath.

* * * * *